Figure 1:
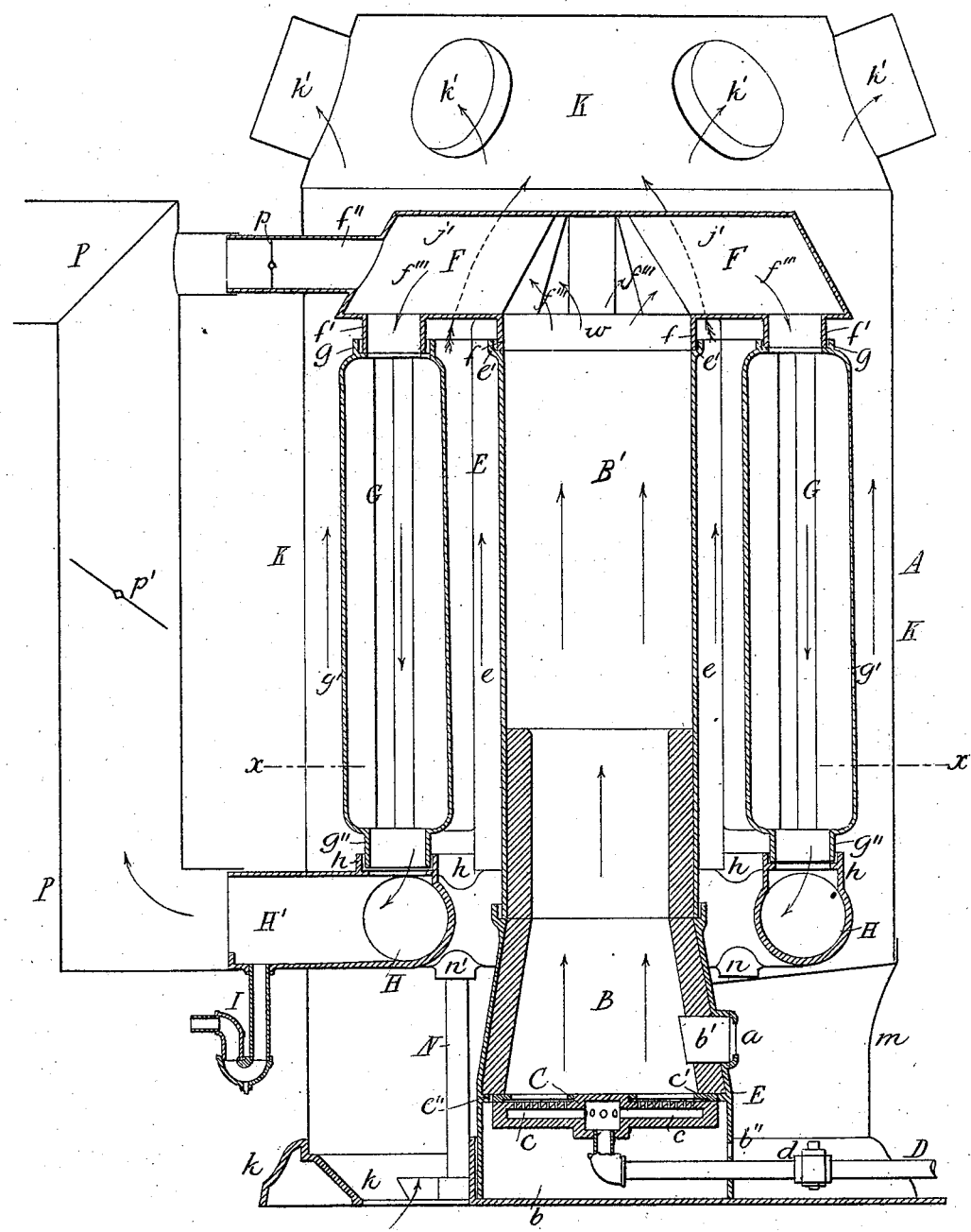

(No Model.) 4 Sheets—Sheet 1.

H. PETTIBONE & B. LOOMIS, Jr.
GAS FIRED DOMESTIC HEATER FOR WATER AND AIR.

No. 574,447. Patented Jan. 5, 1897.

Witnesses
W. J. Norton
M. A. M. Frayser

Inventors
Hawley Pettibone &
Burdett Loomis Jr.
By E. B. Clark.
Attorney (No Model.) 4 Sheets—Sheet 2.

H. PETTIBONE & B. LOOMIS, Jr.
GAS FIRED DOMESTIC HEATER FOR WATER AND AIR.

No. 574,447. Patented Jan. 5, 1897.

Witnesses
Inventors
Hawley Pettibone,
Burdett Loomis Jr.
By E. B. Clark
Attorney.

(No Model.) 4 Sheets—Sheet 4.

H. PETTIBONE & B. LOOMIS, Jr.
GAS FIRED DOMESTIC HEATER FOR WATER AND AIR.

No. 574,447. Patented Jan. 5, 1897.

UNITED STATES PATENT OFFICE.

HAWLEY PETTIBONE AND BURDETT LOOMIS, JR., OF HARTFORD, CONNECTICUT.

GAS-FIRED DOMESTIC HEATER FOR WATER AND AIR.

SPECIFICATION forming part of Letters Patent No. 574,447, dated January 5, 1897.

Application filed August 3, 1894. Serial No. 519,390. (No model.)

*To all whom it may concern:*

Be it known that we, HAWLEY PETTIBONE and BURDETT LOOMIS, Jr., citizens of the United States, residing at Hartford, in the county of Hartford and State of Connecticut, have invented certain new and useful Improvements in Gas-Fired Domestic Heaters for Water and Air; and I do hereby declare the following to be a full, clear, and exact description of the invention, such as will enable others skilled in the art to which it appertains to make and use the same.

This invention relates to domestic heaters adapted particularly to be fired by gas for heating air or air and water to be circulated in a building to be warmed.

The object of our invention is to provide for creating a suitable draft and the circulation of hot gaseous products in the heater; also, for effectively utilizing both the sensible and latent heat of the burning gas by maintaining a high column of burning gas ascending in a combustion-chamber and vertical flue forming a continuation of such chamber and by causing condensation and continuously-increasing gravity of the products of combustion as they descend through the tubes or flues in the heating-chamber in opposition to the inflowing and rising currents of air to be heated. The heat is abstracted from the descending and outflowing hot products by the ascending and inflowing cold air, so that the large percentage of moisture contained in the products is condensed and the latent heat utilized within the furnace instead of escaping to a chimney for creating a draft there. The products of combustion which are not condensed within the heater are passed directly to the outer air without the use of a stack or chimney. Condensation of the large percentage of moisture or steam contained in the products by the inflowing cold air creates a partial vacuum which assists circulation, and the tall ascending column of burning gases also assists circulation by pushing the non-condensable products down through the heating-flues and out through the escape-pipe.

In applying gas to heating domestic air and hot-water heaters many difficulties have been encountered that are not present in the ordinary coal-fired heaters, some of which are as follows:

With updraft-heaters the tendency of the hottest products of combustion is to ascend and quickly escape to the chimney without imparting a fair share of their heat to the pipes or chambers containing the air or water to be heated.

The gases used as fuel, such as natural gas, water-gas, and illuminating-gas, contain a large percentage of hydrogen and hydrogen compound, such as light carbureted hydrogen, which, on being burned, results in aqueous vapor or water, which cannot be discharged to the atmosphere without much difficulty and the sacrifice of a large percentage of heat. If the products of combustion pass to the chimney at a low temperature, the aqueous vapor condenses in the chimney, penetrates the brickwork, and stains the walls. When little gas is being burned in the heater, as in mild weather, the vapor condenses before leaving the heater, dripping back upon the burner in the usual updraft heater or furnace. In attempts heretofore made to remedy these difficulties the aqueous vapors were discharged at the top of the chimney, resulting in much loss of efficiency of the heater and waste of fuel.

Among the methods heretofore used are the following: More air was admitted at the burners than required to effect combustion of the gas, and the chimney-temperature thus reduced; but as the volume of the products of combustion was increased no real economy was effected. Air has also been admitted into the escape-flue from the heater, producing the same result above stated; but no real economy was effected in the use of gas, since the products of combustion as they met the inflowing air must be of sufficiently high temperature to raise the mixture to a temperature that will cause it to discharge at the top of the chimney without condensation.

Some heaters are constructed with a small space for products of combustion, so that when they are run with little gas, in moderate weather, the products will escape quickly without condensation. The waste in these heaters in cold weather is very large, as the products escape at very high temperatures.

All heaters now in the market lose not only that heat which is carried away as sensible heat in the products of combustion, but also the latent heat of the steam or aqueous vapor.

Our heater is designed, by its construction and arrangement, to reduce to the minimum the amount of sensible heat wasted and to save all the latent heat.

Another object of our invention is to provide for uniformly distributing the hot gaseous products from the column of burning gas or vertical flue to the circular series of downtake-flues by means of radial plates forming radial distributing recesses or arms in the dome and also forming extended heating-surfaces for uniformly and highly heating the air passing up in contact with the downtake-flues and between the radial arms of the dome to the outlet hot-air pipes.

We will now describe the details of construction and operation of our gas-fired heater by reference to the accompanying drawings, in which—

Figure 2:
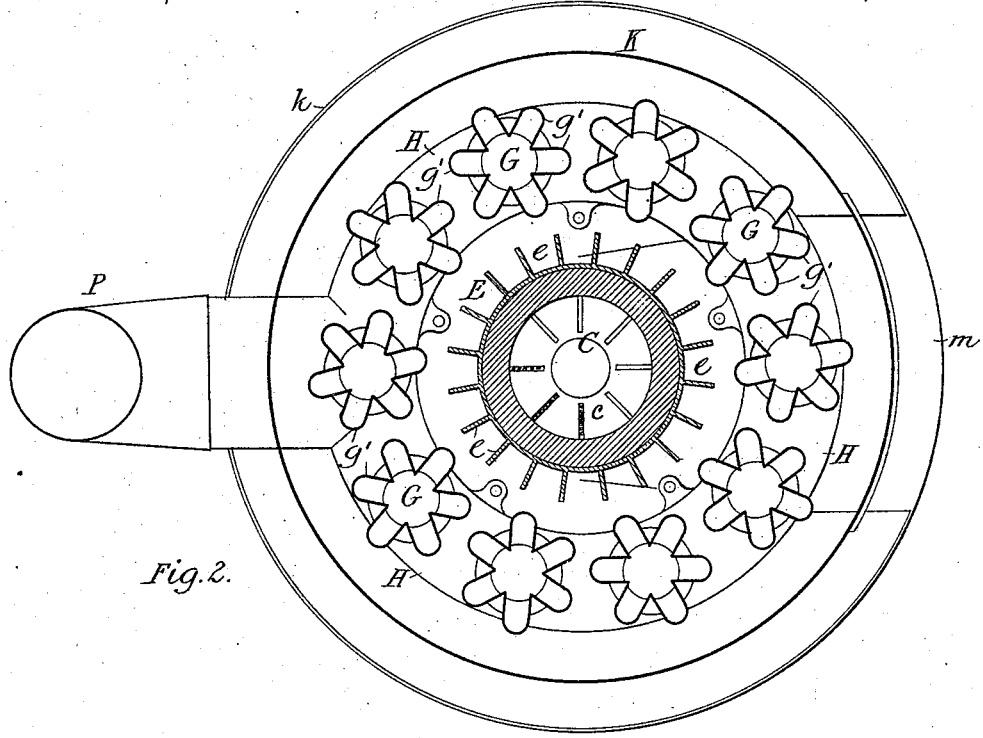
Figure 4:
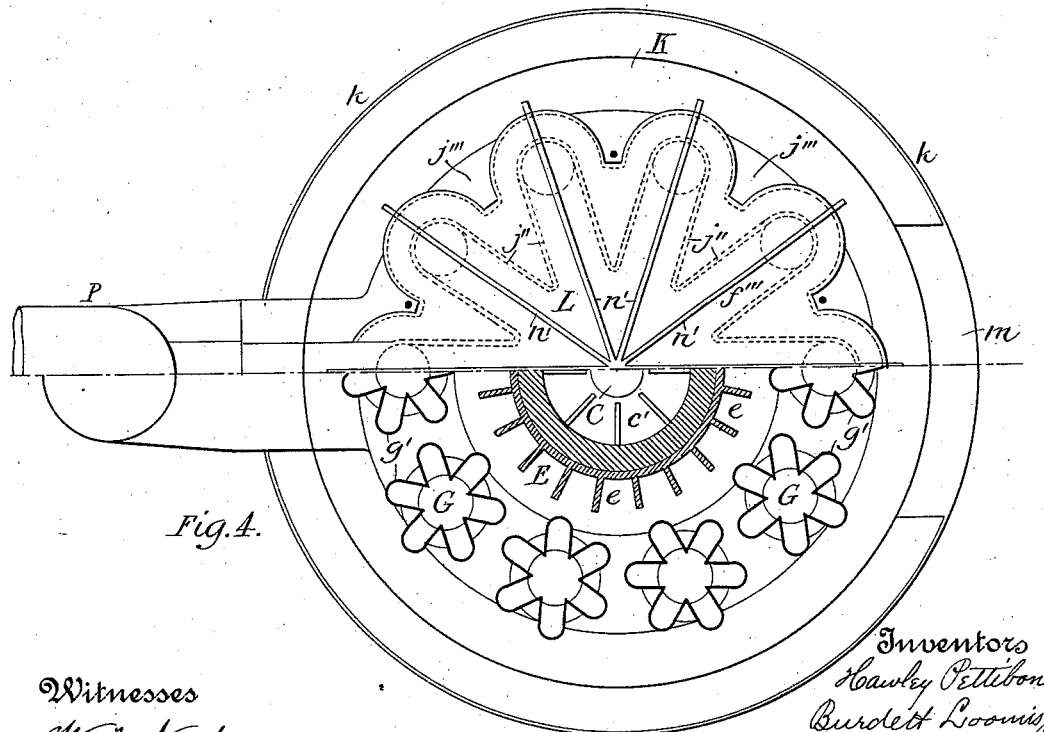
Figure 3:
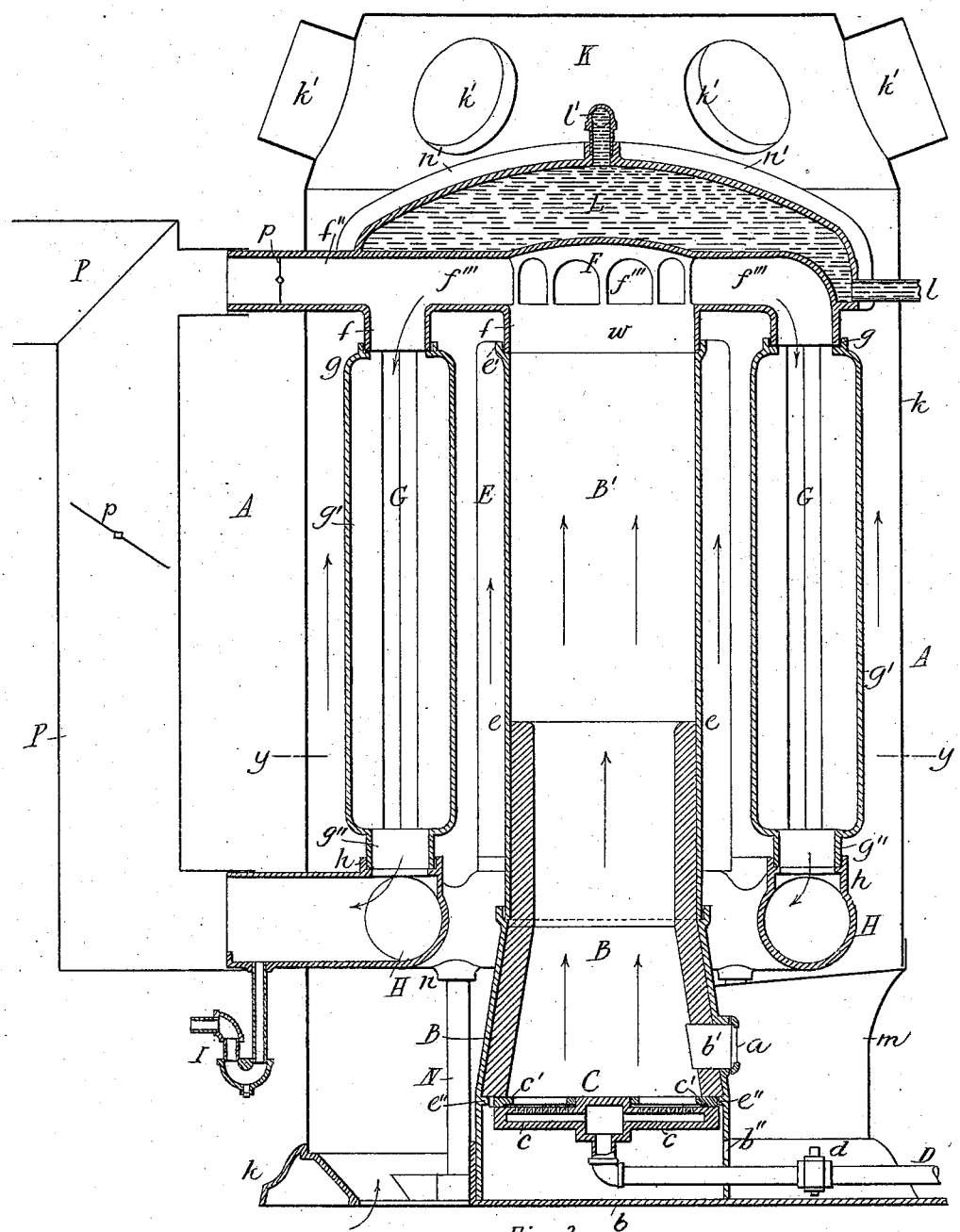
Figure 5:
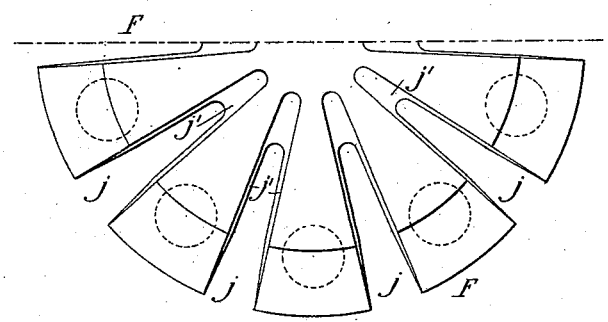
Figure 6:
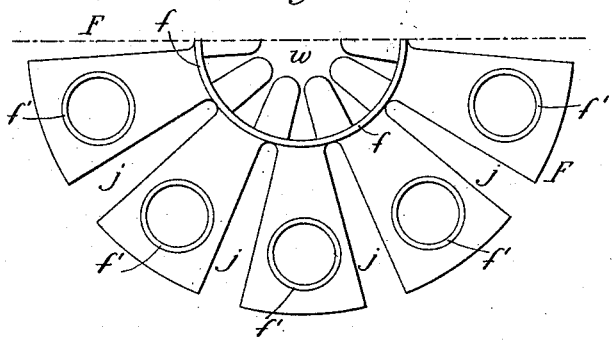
Figure 7:
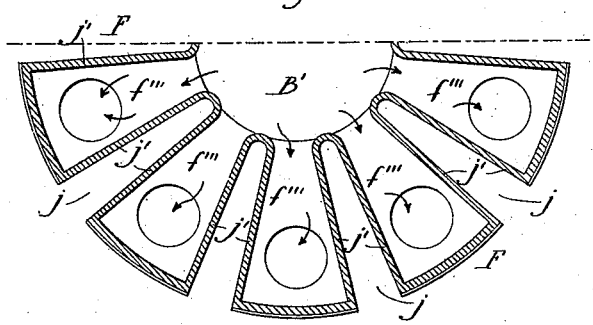

Figure 1 represents a vertical section of the air-heater. Fig. 2 represents a horizontal section thereof on the line $x\, x$, Fig. 1. Fig. 3 represents a vertical section of a combined air and water heater. Fig. 4 represents a top plan view of one half of the air and water heater and a horizontal section of the other half on the line $y\, y$, Fig. 3. Fig. 5 represents a top plan view of one-half of the dome for hot products, showing the radial distributing-arms. Fig. 6 represents a bottom plan view of one-half of the distributing-dome, looking from below upward. Fig. 7 represents a horizontal section of one-half of the distributing-dome near its bottom plate, showing the interior and exterior of the distributing recesses or arms.

The whole heater is designated by the letter A, and it is constructed with a central vertical combustion-chamber B, and an extension-flue B', forming a tall central column for the rise of flame and highly-heated gaseous products.

The combustion-chamber B is constructed with an exterior iron jacket E, having a lining of fire-bricks, which are supported by the inwardly-projecting rib or flange $e''\ e''$, and the lower part of chamber B is preferably made with the walls converging from the base upward, as shown. The iron jacket E is continued upward above the combustion-chamber to form the hot-gas flue or column B' and is provided on its exterior surface with a radial vertical ribs $e$ for conducting heat into the surrounding air-heating chamber. It is also provided at the top with a flanged socket $e'$ for receiving the downwardly-extending flange $f$ of the distributing-dome or crown-piece F. The combustion-chamber B is closed at the bottom by plate $b$ and is provided at the side above the burner with a lighting-opening $b'$, closed by a door $a$.

The burner C is made of a size to fill the whole transverse area of the combustion-chamber and fits up snugly against the lower ends of the fire-brick lining, as shown in Fig. 1. It is constructed with radial perforated arms $c$ and a plate $c'$ above such arms, provided with radial slots just above the perforated arms, so that only the desired limited amount of air shall be supplied to the jets of gas issuing from the perforated radial arm. An air-inlet opening $b''$ is formed in the iron shell below the burner and may be controlled by a damper. A gas-supply pipe D, provided with a valve $d$, connects with the center of burner C.

The distributing and heating dome F is of novel construction and is adapted particularly for uniformly distributing the hot gaseous products from the central combustion-chamber and extension-flue to the circular series of downtake-flues G and for presenting an extended heating-surface for highly heating the air which is circulated in contact with the walls of its radial distributing recesses or arms. The top and bottom plates of said dome are constructed with a series of deep circumferential notches $j$, which are joined by lateral walls $j'$, forming a series of interior radial distributing recesses or arms $f'''$, which open freely into the central portion of the dome and connect with the flue B', as shown in Figs. 1 and 7, for the hot products from the furnace or combustion-chamber. The bottom plate of the dome is provided with a large central opening $w$ and a downwardly-extending circular flange $f$, which fits into the socket $e'$ of the jacket E, and said plate is also provided with a circle of flanges or necks $f'$, extending downward from the outer ends of the radial recesses or arms $f''''$ and fitting into the sockets $g$ of the circular series of downtake-flues G. The circumferential notches in the top plate of the dome extend inward and nearly to the center, as shown in Figs. 1 and 5, and the angular junctures of the said walls are preferably inclined downward and outward to the circumferential flange $f$ of the central opening, as shown. The outer walls of the recesses or arms $f''''$ are also inclined downward and outward, as shown in Figs. 1 and 5. The top, bottom, and side walls of the distributing radial recesses or arms $f''''$ become highly heated by the outgoing hot products from the flue B', and consequently form radiating-surfaces for heating the upwardly-flowing currents of air which pass freely through the notches between them and in contact with the lateral walls $j'$ thereof, as indicated by the arrows, thereby becoming highly heated.

The distributing-dome F naturally becomes the most highly-heated part of the furnace, and the radial walls forming the radial recesses effectively divide up and distribute the current of hot products rising from flue B' into the circular series of downtake-flues G.

Flues G are formed with deep radial grooves or channels $g'$, as shown in Fig. 2, and are provided at their lower ends with circular necks or collars $g''$, which rest in the sockets $h$ of the circular flue H. This latter flue is provided at its under side with bosses $n$, which rest upon the supporting-leg N, as shown in Fig. 1. The circular flue H is also provided with a horizontal outlet H', having connected at its under side a gooseneck seal-pipe I for carrying off water of condensation.

The dome F is provided with a horizontal escape-pipe $f''$, having a damper $p$ for use when starting the operation of heating up the furnace. The lower outlet H' and the upper outlet $f''$ for waste products are preferably connected by the large escape-flue P, having a damper $p'$, and the upper horizontal portion of this flue P is, in practice, extended out through the cellar wall. The waste products may be discharged directly into the open air without the use of a chimney. The heater is inclosed by the hot-air shell K, resting at its lower end upon the annular supporting-ring $k$, and having at the top the thimbles $k'$ for connection of the hot-air pipes. At the lower end of shell K there is formed a large opening and passage $m$, giving access to the lighting-door $a$ of the combustion-chamber B.

In case it is desired to also heat water in the air-heater we construct above the dome F a hot-water chamber L, as shown in Fig. 3, and the upper surface of such chamber is formed with radial strengthening-ribs $n'$, as shown in Figs. 3 and 4. In this combined water and air heater the dome F is also constructed with radial distributing-recesses $f'''$, having side walls and circumferential notches between them, as indicated by the dotted lines $j''$ in Fig. 4, so that hot products may be uniformly distributed to the downtake-flues and air be circulated in contact with the extended heating-surface. The water-chamber L is also provided with circumferential notches $j'''$, forming water-pockets with outer curved walls, as shown in Fig. 4. These circumferential notches in the water-chamber, in conjunction with the notches in the distributing and heating dome, furnish a large extent of radiating and heating surfaces for the ascending currents of air. A water-inlet pipe $l$ connects at one side of chamber L, and an outlet-pipe $l'$ connects with the top central portion thereof for the circulation of water through a radiator or other heating device and through chamber L. Additional water-circulating pipes may be connected to chamber L, if desired. It is thus seen that by a slight modification in the construction of the air-heater it may be adapted for also heating water.

Cold air is supplied to the heater at the base between the supporting-ring $k$ and the combustion-chamber B, as shown by the arrows.

The construction of our heater is quite simple, and the parts can be quickly assembled and fitted together for use.

The operation is also simple, the heater requiring little or no attention after the gas is ignited at the burner.

In operating our furnace care is taken that the gas shall be burned with the smallest proportion of air that will complete the combustion, and air is supplied to the small streams of gas as they issue from the perforated burner-tube, and the mixture then passes up through slots and is burned, the air and gas being intimately mixed and only a limited and necessary amount of air being supplied, while the highest attainable temperature results in the combustion-chamber and flues with the volume of gas burned. The gas having been ignited at the burner, the products are at first allowed to escape through the top flue $f''$ by opening its damper $p$, while the damper $p'$ in the large flue is closed. After a strong draft has been established up through the tall central column B' the damper $p$ is closed and the damper $p'$ opened, causing the hot products of combustion to pass from the distributing-arms of the dome down through the downtake-flues G and out through the circular flue H and its horizontal branch H' to the escape-flue. The incoming cold air, entering the bottom of the heater, strikes the flues containing the outgoing products of combustion as they leave the heater, thus reducing them to the lowest possible temperature before escaping from the heater. As the air rises it comes into contact with more highly-heated surfaces of flues G and the vertical radial ribs $e$ and finally passes through the notches $j$ in contact with the side walls $j'$ thereof in the dome F, where the temperature is hottest, and then escapes through the hot-air pipes.

The deep radial grooves or channels $g'$, formed in the downtake-flues G, greatly extend the heating-surface of such flues and have proved very effective, in practice, in imparting heat to the upwardly-flowing currents of air to be heated. The joints formed by the connections of the necks or flanges $f'$ with the sockets $g$ and by the connections of the necks or collars $g''$ with the sockets $h$ are in practice made tight with suitable cement. The joint formed by the connection of the circular flange $f$ with the socket $e'$ at the top of flue B' is also made tight with cement. All joints can thus be made tight with cement, so that there shall be no leakage of gas or products of combustion from the flues into the air-spaces of the heater.

The heating-surfaces are mostly in the radial ribs $e$, the radial distributing-arms of the dome, the descending flues G, and the bottom circular flue H, so that the condensation of aqueous vapor contained in the products will take place in the descending flues and will be completed in the bottom circular flue, since that is first struck by the inflowing cold air. The condensation, being effected as above described, does not interfere with the proper working of the heater, and the resulting water cannot drip back upon the burner, but is conveniently discharged through the seal-pipe I or any other suitable trap. A tank or tub may be used for receiving the water of condensation.

The heated gases will impart much more of their heat to the flues by being passed down through them than they would by being passed upward, for the reason that the hottest gases have a tendency to rise and stay in the upper part of the heater until they have imparted their heat, after which they drop down through the flue, their descent being aided by the condensation and partial vacuum formed in the lower flue. The non-condensable products are finally forced out by the hot column of gases rising through the central flue.

In practical operation our furnace has proved quite effective and given very economical results in the combustion of gas and the utilization of the sensible heat in the resulting gaseous products and the latent heat in the condensed aqueous vapor.

Having described our invention, what we claim, and desire to secure by Letters Patent, is—

1. The combination with a gas-burner having a combustion-chamber and an extension-flue, of a dome provided with radial passages or recesses, a series of downtake-flues around the extension-flue and combustion-chamber, each radial passage in the dome connecting with a separate downtake-flue of the series, and an annular flue connecting with the lower ends of the downtake-flues and with an escape-flue, as and for the purpose described.

2. The combination with a gas-burner having a combustion-chamber and extension-flue, of a dome provided with radial passages or recesses, a series of downtake-flues, having radial grooves or corrugations, around the extension-flue and combustion-chamber, each radial passage in the dome connecting with a separate downtake-flue of the series, and an annular flue connecting with the lower ends of the downtake-flues and with an escape-flue, as and for the purpose described.

3. In a domestic heater the combination with the combustion-chamber and flue, of a distributing and heating dome having radial plates forming interior radial recesses for distributing the hot products of combustion and providing an extended heating-surface, downtake-flues connecting with said recesses and an annular escape-flue connecting with the lower ends of said flues, substantially as described.

4. In a domestic heater the combination with the combustion-chamber and flue having a socket at the top, of a heating-dome having a central opening, radial recesses, and downwardly-extending flange fitted in said socket and also having circumferential downwardly-extending necks or flanges, $f'$, a series of downtake heating-flues having sockets at their upper ends receiving said necks, $f'$, and also having necks, $g''$, at their lower ends, and an annular escape-flue having sockets $h$, receiving said necks, $g''$, substantially as described.

5. In a domestic heater, the combination with the combustion-chamber and extension-flue, of a heating-dome having circumferential notches and side walls forming interior radial distributing-recesses, a series of downtake heating-flues connecting with said recesses and an annular escape-flue, all suitably connected together, substantially as described.

6. In a domestic heater, the central combustion-chamber B and an extension-flue B', having external vertical ribs, $e$, and forming a tall central column for the rise of flame and hot gaseous products, a distributing-dome F, having radial recesses at the top of said column, the downtake-flues G, having radial grooves or channels, $g'$, and connecting with the recesses of the dome and surrounding said column, the annular escape-flue H, and escape-pipe H', all in combination, substantially as described.

7. In a domestic heater, the combination with the combustion-chamber and extension-flue forming a tall column for the rise of flame and hot gaseous products, of a distributing and heating dome at the top of said column, having radial recesses or compartments, a water-heating chamber L, provided with inlet and outlet pipes, above said dome, downtake-flues connecting with the radial compartments of the dome and an escape-flue connecting with the lower end of said flues, substantially as described.

8. In a domestic heater, the combination with the combustion-chamber and flue, of a distributing and heating dome at the top of said flue and having circumferential notches and lateral walls forming internal radial distributing-recesses, a water-heating chamber L, provided with circumferential notches and with inlet and outlet water-pipes, and placed above said heating-dome, downtake-flues connecting with said distributing-recesses and an escape-flue connecting with the lower ends of said flues, substantially as described.

In testimony whereof we affix our signatures in presence of two witnesses.

HAWLEY PETTIBONE.
BURDETT LOOMIS, JR.

Witnesses:
THOMAS M. SMITH,
GRACE L. LOOMIS.